United States Patent Office 3,480,185
Patented Nov. 25, 1969

3,480,185
CHARGED EFFERVESCING AGENT AND MEDICAMENT DISPENSING METERING VALVE-ACTUATED AEROSOL CONTAINER PRODUCING A DOSE OF MEDICAMENT AND CARBONATION IN WATER
Wallace H. Steinberg, Matawan, N.J., and Saul R. Kohn, Dresher, Pa., assignors to Johnson & Johnson, a corporation of New Jersey
No Drawing. Filed June 20, 1966, Ser. No. 558,628
Int. Cl. A61k 9/00, 27/00
U.S. Cl. 222—192                 11 Claims

ABSTRACT OF THE DISCLOSURE

There is disclosed an anhydrous liquid effervescent pharmaceutical composition sealed in an aerosol package under the pressure of a gaseous propellant. The composition is composed of a medicament, of the type intended for oral ingestion, which is combined with an effervescent couple of an alkaline salt and an organic acid in a suspension of an anhydrous liquid carrier such as ethylene alcohol or propylene glycol. When the composition is released from the container into water, its solid ingredients instantaneously dissolve to form a carbonated fluid containing a medicament.

---

This invention relates to effervescent compositions and more particularly to compositions for addition to water to produce an orally ingestible carbonated fluid containing a medicament such as an analgesic.

Solid compositions in tablet or granular form which upon addition to water effervesce and dissolve are well known. Such compositions have contained medicaments such as analgesics, and, more particularly, aspirin. Such compositions, and particularly in tablet form, have the disadvantage of requiring a substantial time period during which the reaction of the effervescing agents is completed and a complete solution of all components is achieved.

The object of this invention is to provide a composition which when dispersed into water dissolves almost instantaneously.

The object of the present invention is achieved by preparing a non-toxic, anhydrous, water miscible dispersion of effervescing agents, incorporating a medicament, such as an analgesic agent which is stable in the anhydrous water miscible solvent, and, if desired, adding suitable flavoring and sweetening agents. The composition is sealed against environmental humidity and thereby being moisture-free to void decomposition in a pressurized container having a metering valve and the contents are pressurized with a suitable non-toxic gas such as carbon dioxide, mixtures of carbon dioxide, and nitrous oxide or certain organic halogenated hydrocarbons that have been approved for food use, for example, octafluorocyclobutane and monochloropentafluoroethane. A metering valve capable of delivering 3–5 grams of solution is preferably employed.

In the alternative embodiment the composition of the present invention may be placed in cylindrical plunger-activated containers having a suitable seal such as an O -ring at the plunger end and a valve at the nozzle end with a spring for retraction of the valve to the closed position. Markings are provided on the plunger surface to indicate when the proper dose is determined. The effervescing action comes essentially from the acid and the alkaline salt components when the anhydrous solution mixes with water. The propellant has little effect as an effervescing agent.

As the acid component of the effervescent materials, a non-toxic acid acceptable for food purposes is used. Such acids are tartaric, citric, and dl-malic acids, glutaric anhydride, succinic anhydride, and glucono-Δ-lactone. Combinations of such acids in various proportions are preferred as a means for controlling the flocculation of the basic component. The basic component used is a non-toxic, food acceptable base, such as sodium bicarbonate, sodium carbonate or mixtures of these bases.

The acid and the alkaline salt are present in the composition in substantially chemically equivalent amounts, except where it is desirable to adjust the pH depending upon the condition desired in a specific embodiment.

Medicaments employed in the composition of the present invention are those intended for oral ingestion. Such medicaments are preferably water soluble, although readily suspendable water-insoluble medicaments may be employed.

The following examples will serve to illustrate the novel compositions of this invention.

EXAMPLE I

|  | Amount/liter |
|---|---|
| Sodium bicarbonate | grams__ 17.6 |
| Tartaric acid | do____ 80 |
| Anhydrous citric acid | do____ 63 |
| Acetaminophen | do____ 65 |
| Anhydrous ethanol | ml__ 750 |

The solid ingredients are blended in dry form and then are stirred into the anhydrous ethanol until a smooth suspension is formed. In the presence of the tartaric and citric acid, the sodium bicarbonate appears in a flocculated form. In this form there is much less tendency for the sodium bicarbonate to cake upon standing. The citric acid, tartaric acid and acetaminophen dissolve in the anhydrous alcohol.

The resulting composition is sealed in an aerosol container equipped with a metering valve capable of measuring 3 to 5 cc. of the mixture upon depression of the metering valve. The can is charged with carbon dioxide to a pressure of about 90 pounds per square inch.

EXAMPLE II

|  | Amount/liter |
|---|---|
| Sodium bicarbonate | grams__ 176 |
| Tartaric acid | do____ 80 |
| Anhydrous citric acid | do____ 63 |
| Acetaminophen | do____ 65 |
| Propylene glycol | ml__ 777 |

The ingredients are mixed, blended and stirred into the propylene glycol until a smooth suspension is obtained. The mixture is placed in an aerosol container equipped with a metering valve capable of measuring a 3 to 5 cc. dose upon actuation of the valve. The container is sealed and charged with monochloropentafluoroethane to a pressure of 40 pounds. In the alternative, nitrous oxide or carbon dioxide may be used in place of the fluorine compounds.

Aspirin undergoes degradation upon long term standing in the presence of anhydrous ethanol or propylene glycol. With the proper non-aqueous, water-miscible food acceptable fluid in which aspirin is not so degraded, aspirin may be used in place of acetaminophen as the analgesic component of the composition of this invention. The same applies as well to aluminum aspirin and aspirin derivatives.

EXAMPLE III

The following formula illustrates an antacid composition prepared according to this invention. The formulation is based on two 5 ml. doses for an adult.

| | Percent w./v. |
|---|---|
| Magnesium hydroxide | 4.0 |
| Aluminum hydroxide dried gel | 4.0 |
| Sodium bicarbonate | 17.6 |
| Tartaric acid powder | 8.5 |
| Anhydrous citric acid | 6.2 |
| Anhydrous ethanol, q.s. 100.0%. | |

The ingredients are mixed, blended and stirred into the anhydrous alcohol until a smooth suspension is obtained. The mixture is placed in an aerosol container equipped with a metering valve capable of measuring a 5 cc. dose upon actuation of the valve. The container is sealed and charged with monochloropentafluoroethane to a pressure of 40 pounds. In the alternative, nitrous oxide or carbon dioxide may be used in place of the fluorine compounds.

EXAMPLE IV

The following formulation illustrates a composition suitable for the treatment of nervous tension, prepared according to this invention. The formulation is based on two 5 ml. doses for an adult.

| | Percent w./v. |
|---|---|
| Acetaminophen | 6.0 |
| Scopolamine hydrobromide | 0.0015 |
| Methapyrilene hydrochloride | 0.25 |
| Sodium bicarbonate | 17.6 |
| Tartaric acid | 8.5 |
| Anhydrous citric acid | 6.2 |
| Anhydrous ethanol, q.s. 100.0%. | |

The ingredients are mixed, blended and stirred into the anhydrous alcohol until a smooth suspension is obtained. The mixture is placed in an aerosol container equipped with a metering valve capable of measuring a 5 cc. dose upon actuation of the valve. The container is sealed and charged with monochloropentafluoroethane to a pressure of 40 pounds. In the alternative, nitrous oxide or carbon dioxide may be used in place of the fluorine compounds.

EXAMPLE V

The following formulation illustrates a laxative composition, prepared according to this invention. The formulation is based on two 5 ml. doses for an adult.

| | Percent w./v. |
|---|---|
| Exsiccated sodium phosphate | 20.0 |
| Sodium bicarbonate | 17.6 |
| Tartaric acid | 8.5 |
| Anhydrous citric acid | 6.2 |
| Anhydrous ethanol, q.s. 100.0%. | |

The ingredients are mixed, blended and stirred into the anhydrous alcohol until a smooth suspension is obtained. The mixture is placed in an aerosol container equipped with a metering valve capable of measuring a 5 cc. dose upon actuation of the valve. The container is sealed and charged with monochloropentafluoroethane to a pressure of 40 pounds. In the alternative, nitrous oxide or carbon dioxide may be used in place of the fluorine compounds.

EXAMPLE VI

The following formulation illustrates an analgesic-cold-cough formulation, prepared according to this invention. The formulation is based on two 5 ml. doses for an adult.

| | Percent w./v. |
|---|---|
| D-Methorphan | 0.15 |
| Phenylephrine hydrochloride | 0.1 |
| Vitamin C | 0.5 |
| Acetaminophen | 6.0 |
| Sodium bicarbonate | 17.6 |
| Tartaric acid | 8.5 |
| Anhydrous citric acid | 6.2 |
| Anhydrous ethanol, q.s. 100.0%. | |

The ingredients are mixed, blended and stirred into the anhydrous alcohol until a smooth suspension is obtained. The mixture is placed in an aerosol container equipped with a metering valve capable of measuring a 5 cc. dose upon actuation of the valve. The container is sealed and charged with monochloropentafluoroethane to a pressure of 40 pounds. In the alternative, nitrous oxide or carbon dioxide may be used in place of the fluorine compounds.

EXAMPLE VII

The following formulation illustrates a mouth wash and gargle composition having superior cleansing action and imparting a good mouth feel, prepared according to this invention. The formulation is based on one 5 cc. dose to be charged into 25 cc. of water.

| | Percent w./v. |
|---|---|
| Cetylpyridinium chloride | 1.25 |
| Sodium bicarbonate | 17.6 |
| Tartaric acid | 8.5 |
| Anhydrous citric acid | 6.2 |
| Mint flavor, q.s. | |
| Anhydrous ethanol, q.s. 100.0%. | |

In place of cetylpyridinium chloride, other quaternary ammonium salts, or combinations thereof, may be employed, for example, dequalinium acetate and benzalkonium chloride.

The ingredients are mixed, blended and stirred into the anhydrous alcohol until a smooth suspension is obtained. The mixture is placed in an aerosol container equipped with a metering valve capable of measuring a 5 cc. dose upon actuation of the valve. The container is sealed and charged with monochloropentafluoroethane to a pressure of 40 pounds. In the alternative, nitrous oxide or carbon dioxide may be used in place of the fluorine compounds.

What is claimed is:

1. An anhydrous liquid pharmaceutical composition producing a metered predetermined oral dose of medicament in a carbonated solution when dispersed in water and dissolving therein faster than solid effervescent couples in tablet or granular form, consisting essentially of at least one solid, water soluble or readily suspendable medicament intended for oral ingestion and which is pharmaceutically compatible with the other ingredients and otherwise not degraded upon standing in the presence of anhydrous ethanol or propylene glycol, an effervescent couple comprising a non-toxic food acceptable solid alkaline salt, and at least one non-toxic food acceptable solid organic acid, said alkaline salt and said organic acid being present in substantially chemically equivalent amounts to deliver an effervescent action when the composition mixes with water, said solid ingredients being in a smooth blended admixture with a water miscible non-toxic food acceptable anhydrous liquid carrier selected from the group consisting of ethyl alcohol and propylene glycol, said composition being sealed in an aerosol container against environmental humidity to avoid decomposition and thereby being moisture-free, said container having a metered valve and the contents pressurized with at least one non-toxic food acceptable gaseous propellant having little effect as an effervescent agent for said composition selected from the group consisting of carbon dioxide, nitrous oxide, octafluorocyclobutane and monochloropentafluoroethane.

2. The composition of claim 1 wherein the acids are selected from the group consisting of tartaric, citric di-malic acids, glutaric and succinic anhydrides and glucono-Δ-lactone.

3. The composition of claim 1 wherein the medicament is acetaminophen.

4. The composition of claim 1 wherein the organic acid is a mixture of tartaric and citric acids, said acids taken together being present in said composition in amounts substantially chemically equivalent to the quantity of alkaline salt.

5. The composition of claim 1 wherein the medicament is cetylpyridinium chloride.

6. The composition of claim 1 wherein the medicaments are magnesium hydroxide and aluminum hydroxide dried gel.

7. The composition of claim 1 wherein the medicaments are acetaminophen, scopolamine hydrobromide and methapyrilene hydrochloride.

8. The composition of claim 1 wherein the medicament is exsiccated sodium phosphate.

9. The composition of claim 1 wherein the medicaments are D-methorphan and phenylephrine hydrochloride.

10. The composition of claim 1 consisting of the following ingredients in grams per liter in 750 ml. of anhydrous ethanol:

| | Grams |
|---|---|
| Sodium bicarbonate | 176 |
| Tartaric acid | 80 |
| Anhydrous citric acid | .63 |
| Acetaminophen | 65 | said composition in 5 ml. quantities providing two adult doses of acetaminophen.

11. The composition of claim 1 consisting of the following ingredients in grams per liter in 777 ml. of propylene glycol:

| | Grams |
|---|---|
| Sodium bicarbonate | 176 |
| Tartaric acid | 80 |
| Anhydrous citric acid | 63 |
| Acetaminophen | 65 |

References Cited

UNITED STATES PATENTS

| | | | |
|---|---|---|---|
| 2,537,453 | 1/1951 | Frangialli | 99—78 |
| 2,585,183 | 2/1952 | Blumauer | 99—49 XR |
| 2,695,236 | 11/1954 | Barton | 99—79 XR |
| 2,865,756 | 12/1958 | Merory | 99—78 |
| 2,977,231 | 3/1961 | Fox et al. | 99—79 |
| 2,999,293 | 9/1961 | Taff et al. | 424—44 |
| 3,105,792 | 10/1963 | White | 424—44 |
| 3,136,692 | 6/1964 | Bandelin | 424—44 |
| 3,222,187 | 12/1965 | Winter | 99—140 |
| 3,293,045 | 12/1966 | Griffin | 99—140 XR |
| 3,385,713 | 5/1968 | Levinson et al. | 99—140 |

SHEP K. ROSE, Primary Examiner

U.S. Cl. X.R.

99—79, 189; 252—305, 350; 424—43, 44, 45

UNITED STATES PATENT OFFICE
CERTIFICATE OF CORRECTION

Patent No. 3,480,185

November 25, 1969

Wallace H. Steinberg et al.

It is certified that error appears in the above identified patent and that said Letters Patent are hereby corrected as shown below:

Column 1, line 55, "void" should read -- avoid --. Column 5, line 25, "176' should read -- 17.6 --. Column 6, line 14, "2,585,183" should read -- 2,584,183 --.

Signed and sealed this 24th day of March 1970.

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,480,185              Dated     November 25, 1969

Inventor(s) Wallace H. Steinberg et al

It is certified that error appears in the above-identified patent and that said Letters Patent are hereby corrected as shown below:

In the Abstract, line 7, "ethylene" should read -- ethyl --.

SIGNED AND
SEALED
JUN 23 1970

(SEAL)
Attest:

Edward M. Fletcher, Jr.                WILLIAM E. SCHUYLER, JR.
Attesting Officer                      Commissioner of Patents